UNITED STATES PATENT OFFICE.

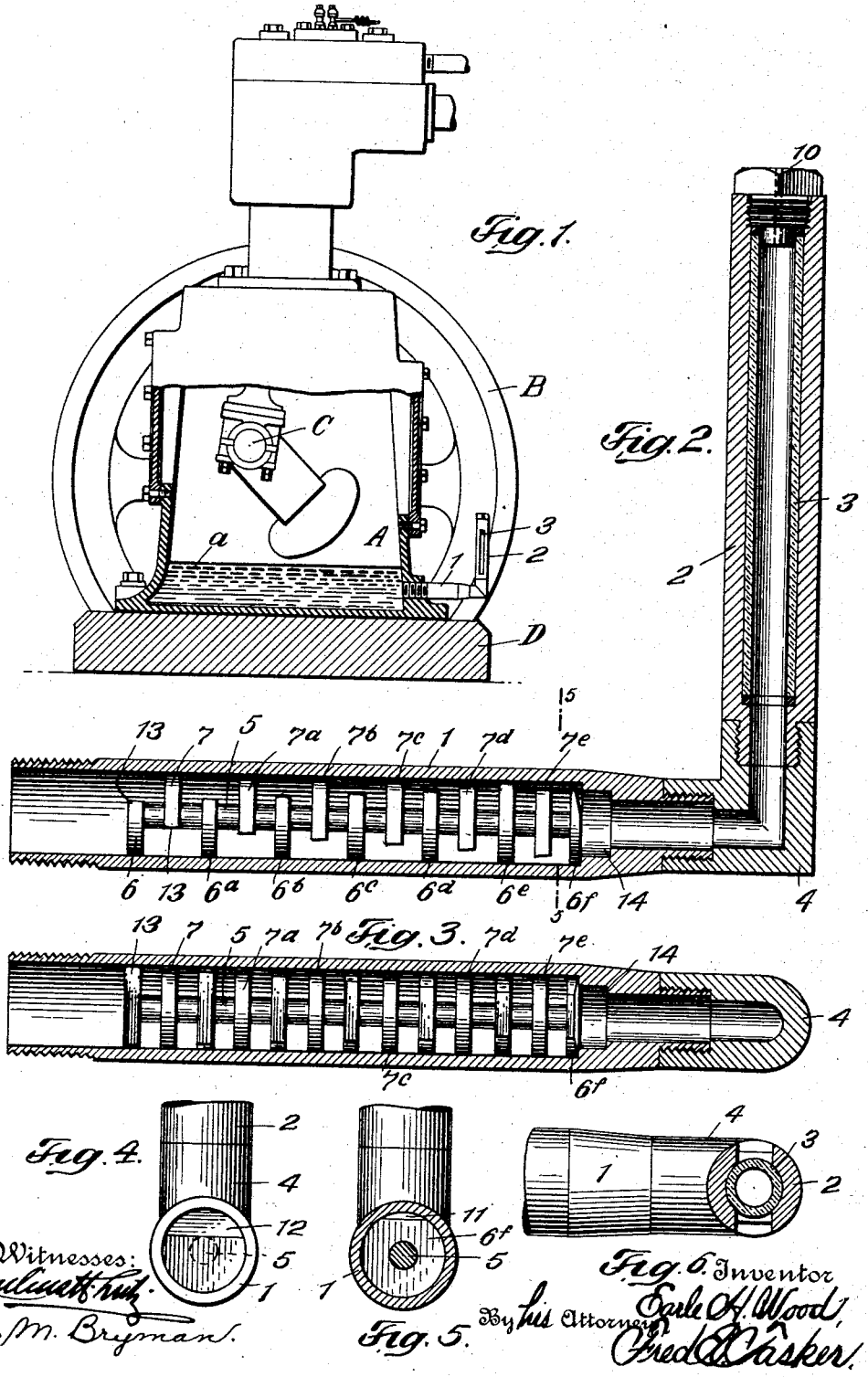

EARLE H. WOOD, OF JERSEY CITY, NEW JERSEY.

GAGE FOR FLUIDS OR LIQUIDS.

1,186,260.  Specification of Letters Patent.  Patented June 6, 1916.

Application filed March 31, 1914. Serial No. 828,520.

*To all whom it may concern:*

Be it known that I, EARLE H. WOOD, a citizen of the United States, residing at Jersey City, in the county of Hudson and State of New Jersey, have invented certain new and useful Improvements in Gages for Fluids or Liquids, of which the following is a specification, reference being had therein to the accompanying drawing.

This invention relates to gages for determining the level in oil, fluid or liquid containers of various kinds, more especially in the crank casings of internal combustion engines, as for instance, those operating on what is known as the splash system, also in gasolene tanks and all kinds of liquid fuel compartments and lubricant chambers.

The object of the invention is to provide a glass or other visible gage device whereby the level of the oil can be determined at any time at a glance, the level being the actual level in the casing with which the gage is connected and being undisturbed on account of the agitation of the lubricant in the casing owing to the movement of the mechanical parts therein.

The invention comprises essentially a passage between the fluid container and the gage glass, which passage is provided with a series of baffle partitions of a suitable construction to afford obstructions to the fluid current and thereby make the flow of the same so sluggish that the level in the glass will not be affected by the movement in the fluid container; and the invention also comprises numerous details and peculiarities in the construction, arrangement and combination of parts, substantially as will be hereinafter described and then more fully pointed out in the claims.

In the accompanying drawing illustrating my invention: Figure 1 is a vertical sectional side elevation of the crank casing on a gasolene engine with the accompanying parts, and shows the way in which my improved gage is applied thereto. Fig. 2 is a vertical section of my improved gage. Fig. 3 is a horizontal section of the same. Fig. 4 is a left end view of the device as shown in Figs. 2 and 3. Fig. 5 is a cross section. Fig. 6 is a horizontal detail sectional plan.

Similar characters of reference designate corresponding parts throughout the different figures of the drawing.

In order to illustrate one form of engine construction with which my improved gage may be applied, I have delineated in Fig. 1 an internal combustion engine having a bed plate D, a crank shaft C, a crank casing A, and a fly wheel B, the crank casing being shown as containing a quantity of lubricating oil at $a$, all these parts being represented here simply for the purpose of illustration and not with any idea of having the invention restricted thereto. In the wall of the casing A is screwed a horizontal tube 1 which is below the usual level to which the lubricant $a$ will ever drop, so that there may always be a quantity of lubricant within the pipe 1. Pipe 1 is connected with a vertical tube 2 by means of a right-angled coupling 4, and said tube 2 is slotted to expose the length of an interior glass tube 3 held therein by means of a screw plug 10. By observing the glass 3, the level of the oil $a$ is determined at any particular moment. It will be understood that when the engine is in operation the interior of the casing A contains an amount of lubricating oil in a state of violent agitation owing to the movement of the mechanical crank parts therein.

A considerable amount of the lubricant is in a state of suspension on the moving parts and on the interior of the casing at all times, since the shaft makes a very large number of revolutions per minute. Hence, an ordinary pipe leading from said chamber to a glass could not possibly afford any idea of the oil level in the casing A since the splashing about of the oil is going on all the time that the engine is in operation and there would be a constant movement in the glass that would make it impossible to read the level or determine therefrom the quantity of oil still remaining in the casing. It is to avoid the effect of this violent splashing and make it possible to read the oil level at all times that I have devised my present improvements, and they consist essentially in placing within the passage, as the pipe 1, between the fluid container and the glass through which the level of the fluid is read, a suitable obstructing means which will make it possible for the oil to surge freely back and forth through said pipe, but will cause it to move sluggishly, its flow being seriously obstructed so that while there is a very stormy movement in the end of the pipe 1 nearest the casing A, there will be a perfect calm in the opposite end nearest to the glass. I accomplish this by the employment of a device consisting of a central rod 5 carrying thereon a series of truncated disks which serve as partitions in the pipe 1, said disks being circular except for the segment of the same which is cut away. These disks or partitions vary in size from one that is substantially semi-circular to one that has a very slight or small segment of the circle removed. There are two series of these disks, one consisting of disks 6, 6$^a$, 6$^b$, 6$^c$, 6$^d$, 6$^e$, 6$^f$, and so on, and the other consisting of disks, 7, 7$^a$, 7$^b$, 7$^c$, 7$^d$, 7$^e$, etc. The members of the latter series intervene between the members of the first mentioned series and all are formed integral with or securely attached to the shaft 5. With the device in the position shown in Figs. 1 and 2, the series of disks 6, 6$^a$, etc., are in contact with the lower part of the tube 1 and serve as lower partitions, while the series of disks 7, 7$^a$, etc., are in contact with the upper interior wall of the tube 1 and serve as upper partitions. Disks 7, 7$^a$, etc., as I have said, alternate with disks 6, 6$^a$, etc. The disks nearest the inlet end of the pipe 1, that is to say nearest the casing A, as disks 6 and 7, are the smallest, being a little more than a semi-circle in size as indicated by the cut-away portion at 12 in Fig. 4, and the following disks in each series are each a little larger than its predecessor, so that when the final end of the series is reached, as for instance, the disks 7$^e$ and 6$^f$, said disks are found to be almost a complete circle with only a small segment cut therefrom, as shown at 11 in Fig. 5. Thus the cut off edges of all the disks in the series from 6 to 6$^f$ lie in an inclined plane, and similarly the disks in the series from 7 to 7$^e$ have their cut off edges in an inclined plane. This straight edge of each disk of course has a thickness equivalent to the thickness of the disk, and the surface of the edge instead of being right-angled, is preferably inclined, as shown at 13, in order to permit a better action of the fluid, as is found to be the case in experience. In saying that one series of disks constitutes a series of partitions in the bottom of the tube 1, and the other series a series of partitions in the top of the tube 1, I do not wish to be understood as implying that these locations are at all essential, for the positions may be such that they can be referred to as being at the sides of the tube or at any intermediate point between the sides and the top and bottom, but the best results are obtained, however, by having these disks alternate with their curved edges on opposite sides of their central shaft and the straight edges likewise alternating on opposite sides of the central shaft. As the fluid or other liquid is driven violently into the end of the tube 1 and strikes the smaller disk, which is, of course, the disk with the larger opening between it and the opposite wall of the pipe 1, said disk will act as a baffle plate for the fluid but will allow it to pass the first disk and strike the second disk, by which it will be deflected over to the other side of the shaft 5 and caused to strike the third disk, by which it will be again deflected. Hence, by the series of alternating disks serving as partitions, as I have specified, fluid lubricant, or other liquid will be caused to flow more and more slowly until after it has passed several of the disks. Its agitation will be quieted and its flow reduced to a pretty steady movement, while in the glass it will be practically quiet, the level naturally rising and falling in accordance with the true level of the lubricant as it exists in the crank casing.

Many changes may be made in the precise construction and arrangement of the various parts without exceeding the scope of the invention, as for instance, there may be any number of disks, their size may vary and instead of being a uniform series of gradually increasing size, they may change their size without uniformity in the progression, but these and all other changes may obviously be made without destroying the fundamental principle of the invention which consists in having a series of baffling plates or partitions for quieting the flow of an agitated liquid and transmitting said flow into a calm lifting or falling of the liquid level in order that a gage may be successfully applied to the determination of the level of a body of liquid which is in a condition of stormy action.

It should be noted that the interior bore of the pipe 1 is tapered from the inlet end toward the opposite end and the series of disks must be correspondingly tapered, that is to say, the peripheries of the disks will gradually decrease in size, the diameters of the said disks gradually shortening from the first disks 6 and 7 to those at the opposite end of the row 6$^f$ and 7$^e$. The purpose of this gradual taper in the series of disks and a corresponding gradual taper in the interior bore of pipe 1 is that the series of disks may be held tightly within the pipe by the action against them of the volume of lubricant or other fluid at the inlet end of the pipe 1. The taper construction allows a tight fit and permits the lubricant to crowd the disks toward the small end thus holding them firm and steady and preventing objectionable rotation. There will be preferably a very small space between the last disk 6$^f$ and the end of the pipe 1 or the collar 14.

Having thus described my invention, what I claim as new and desire to secure by Letters Patent, is:—

1. In a gage of the class specified, the combination with a glass for viewing the level of the liquid or fluid, of a passage leading thereto comprising a pipe, and a series of alternately arranged baffle disks placed therein and a central rod carrying the said baffle disks, said disks gradually increasing in size from one end of the series to the other and the outer edges of the baffle disks being in engagement with the inner walls of the said pipe.

2. In a gage of the class specified, the combination with a glass for viewing the level of the liquid or fluid, of a passage leading thereto comprising a pipe, and a series of baffle disks placed therein and a central rod carrying the said baffle disks, said disks being arranged in two series alternating with each other and each series consisting of members gradually increasing in size from one end of the series to the other, the said series of disks and supporting rod being removable from the pipe and the outer edges of the disks being arranged to engage with the inner walls of the pipe when in place therein.

3. In a gage of the class specified, the combination with a fluid or liquid chamber, of a glass for indicating the fluid level, a horizontal passage between the glass and the chamber, a series of circular disks having cut off segments and a central stem carrying the said disks and arranged in the said horizontal passage.

4. In a gage of the class specified, the combination with a fluid or liquid chamber, of a glass for viewing the level of the fluid or liquid, and a pipe leading from said chamber to the glass, together with a rod located axially in said pipe, and a series of disks having cut off segments, said disks being arranged in two series whose members alternate as regards the position of their cut off portions so as to provide a circuitous route for the fluid or liquid and permit the flow of the same at one end to be calm and at the other end agitated.

5. In a gage of the class specified, the combination with a fluid or liquid chamber, of a glass for viewing the level of the fluid or liquid, and a pipe leading from said chamber to the glass, together with a rod located axially in said pipe, and a series of disks having cut off segments, the disks being carried by said rod and arranged in two series the members of which alternate with reference to the position of their cut off parts and all the members of each series gradually increasing in size from one end of the series to the other.

In testimony whereof I affix my signature in the presence of two witnesses.

EARLE H. WOOD.

Witnesses:
FRANK H. VICK, Jr.,
ESTELLE M. BRYMAN.

Copies of this patent may be obtained for five cents each, by addressing the "Commissioner of Patents, Washington, D. C."